Figure 1:
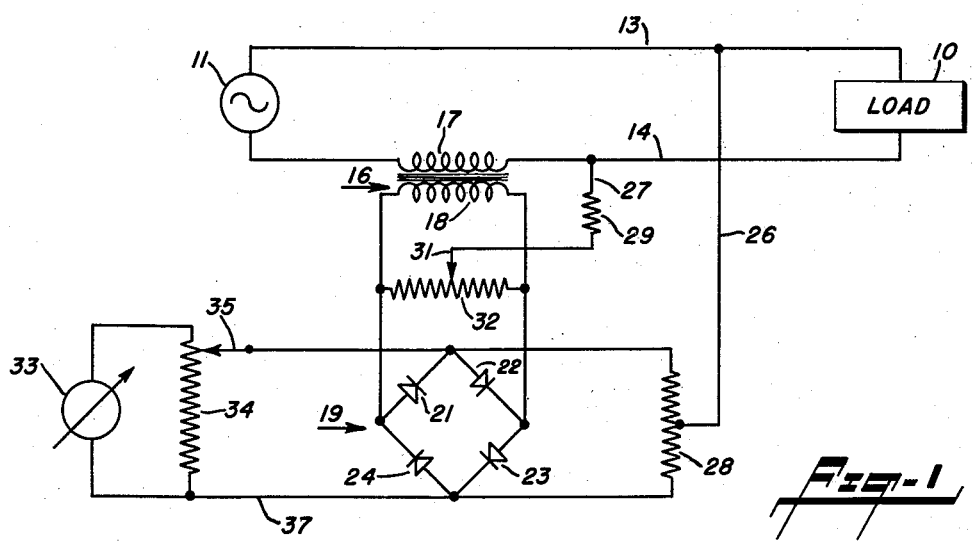

April 1, 1958 J. H. MILLER 2,829,343
LOAD METER
Filed June 22, 1956 2 Sheets-Sheet 1

JOHN H. MILLER
INVENTOR.

BY
Rudolph J. Lurich
ATTORNEY

April 1, 1958     J. H. MILLER     2,829,343
LOAD METER

Filed June 22, 1956     2 Sheets-Sheet 2

JOHN H. MILLER
INVENTOR.

BY
Rudolph L. Lurick
ATTORNEY

United States Patent Office 2,829,343
Patented Apr. 1, 1958

2,829,343

LOAD METER

John H. Miller, Short Hills, N. J., assignor, by mesne assignments, to Daystrom, Incorporated, Murry Hill, N. J., a corporation of New Jersey Application June 22, 1956, Serial No. 593,116

4 Claims. (Cl. 324—142)

This invention relates to an apparatus for measuring an electrical load, and more particularly to an electrical instrument and circuitry for measuring the in-phase component of a load current with relationship to the load voltage.

This invention contemplates the provision of an electrical indicating instrument and associated rectifier modulator bridge circuitry for use in measuring electrical loads. The apparatus will be particularly described as a motor load indicator wherein the power load on machine tools, such as lathes and grinders, may be readily ascertained. It will be understood however, that this description is not intended as a limitation of the invention to any particular use, as it will be apparent to those skilled in this art that the apparatus may be used for indicating any type load and is not limited to use as a motor load indicating device.

The electrical current which a machine tool motor draws from a supply line will vary depending upon the mechanical load on the machine tool. If the voltage source remains at a substantially constant value regardless of the load on the line, as is often the case, the in-phase component of motor current will be directly related to the power delivered to the load. The load meter of this invention measures the in-phase component of the current supplied to the load. In this manner the load meter may be used to indicate the optimum loading of the machine tool, which is generally the maximum continuous loading which may safely be placed upon the machine.

An ammeter, in series connection with the machine tool motor supply line, has previously been used to indicate motor load; however, the simple ammeter falls short of an ideal load meter in several respects; namely, (1) The ammeter reads total current, which includes the lagging (or leading) current in addition to the in-phase component of current, (2) The current which a machine tool motor draws under no-load value may be of a considerable value (even the in-phase current), and is frequently so large as to obscure additional increments of current as the machine tool load is increased, and (3) Setting of the ammeter full scale value to match the full load on the machine tool, either permanently or temporarily, necessitates circuit changes. The load meter of my invention obviates all of the above mentioned short-comings of the simple ammeter.

An object of this invention is the provision of a novel electrical indicating apparatus by which motor loading may be easily and quickly measured.

An object of this invention is the provision of a load meter for determining the in-phase component of current which is supplied to a load.

An object of this invention is the provision of a load meter comprising a D.-C. indicating instrument, a rectifier modulator bridge network and associated circuitry for obtaining readings on the D.-C. instrument which are indicative of the in-phase component of load current supplied to the load.

An object of this invention is the provision of a motor load meter comprising a D.-C. indicating instrument, a rectifier modulator bridge network and associated circuitry including means for adjusting the D.-C. instrument to a zero reading under motor no load conditions.

An object of this invention is the provision of a load meter comprising a D.-C. indicating instrument, a rectifier modulator bridge network in electrical circuit connection therewith, and a potentiometer in the D.-C. indicating instrument circuit, whereby full scale deflection of the said D.-C. instrument may be made to correspond to full load condition.

An object of this invention is the provision of a motor load meter for measuring the in-phase component of motor current comprising a modulator bridge having rectifier elements arranged in the same sense in the respective side arms thereof; a reference circuit connected in shunt to the supply line and to the said modulator bridge through a potentiometer and through a center-tapped resistor, the said potentiometer and center-tapped resistor being connected across each set of opposing bridge junctions, the said reference circuit supplying a reference current sufficient to saturate the modulator bridge; a signal circuit for the said modulator bridge including a current transformer having a primary winding in series connection with a supply line to a motor, and a secondary winding across one set of opposed junctions of the said modulator bridge; and an indicator circuit including a D.-C. measuring instrument connected across the other set of opposed bridge junctions.

These and other objects and advantages will become apparent from the following description when taken with the accompanying drawings. It will be understood that the drawings are for purposes of illustration and are not to be construed as defining the scope or limits of the invention, reference being had for the latter purposes to the appended claims.

Figure 2:
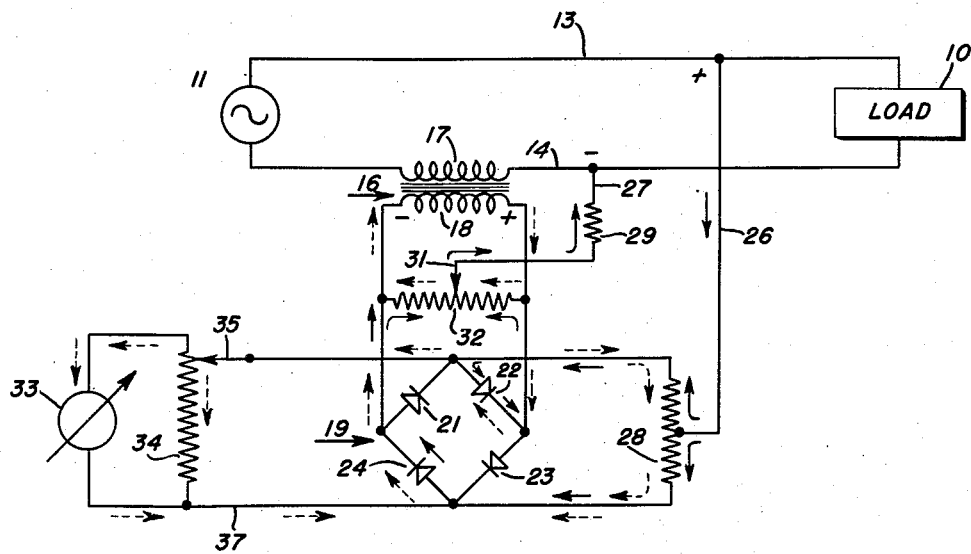
Figure 3:
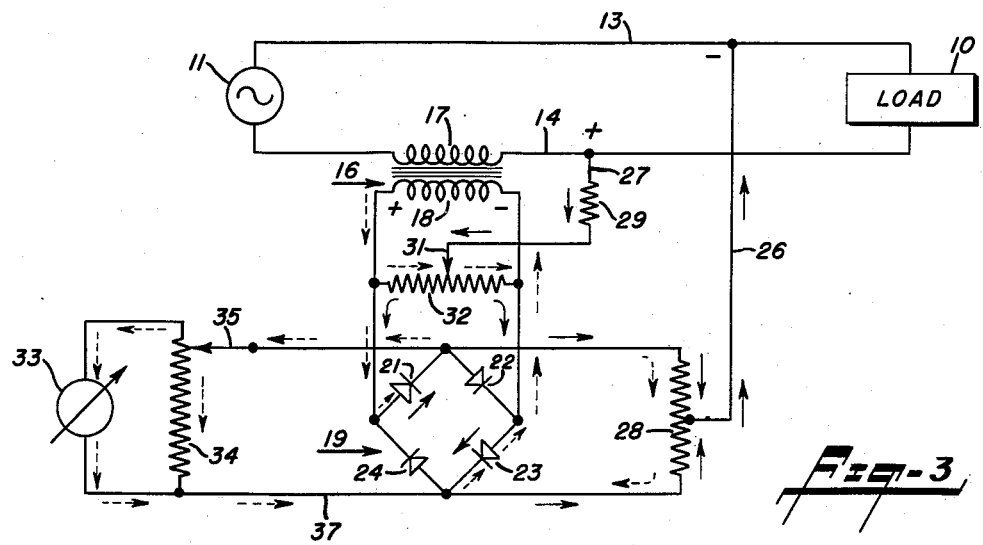
Figure 4:
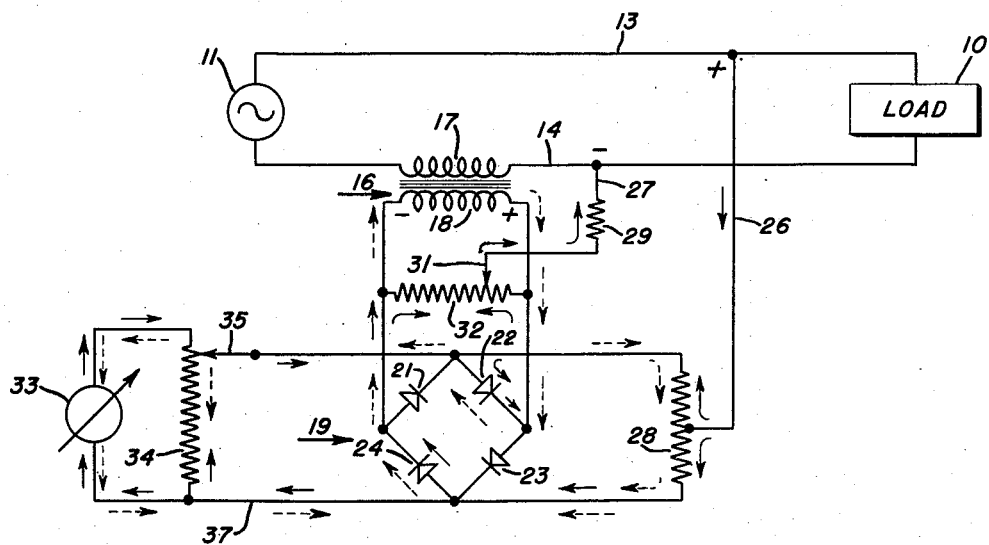

In the drawings wherein like reference characters denote like parts in the several views;

Figure 1 is a schematic circuit diagram of my novel electrical load meter apparatus and shown in an operative circuit arrangement, and Figures 2 through 4 are similar to Figure 1 with the addition of polarity and current direction markings whereby the current flow under various conditions is indicated.

Referring to Figure 1 of the drawings, reference numeral 10 designates a load, which may be a motor on a machine tool such as a lathe or grinder, for example, and which is connected to an A.-C. source of potential 11 by the electrical conductors 13 and 14. The A.-C. source of potential 11 may be the ordinary 115 volt supply. The primary winding 17 of a transformer 16 is connected to the electrical conductor 14 in series with the load 10. It will be apparent that the current to the load 10 passes through the primary winding 17 of the transformer 16. The resulting voltage which appears at the transformer secondary winding 18 is utilized in my novel load meter to be described.

My novel load meter includes a rectifier modulator bridge 19 comprising four rectifier elements 21, 22, 23, and 24 arranged in the same sense in a closed ring. The rectifier elements are preferably of the semi-conductor type, such as copper-oxide rectifiers, although they may be of the vacuum tube type. The modulator bridge functions as a polarized rectifier in my novel load meter circuit.

A polarizing, or reference, voltage is supplied to the modulator bridge 19 by the A.-C. source of potential 11 through the lead wires 26 and 27 which are connected to the electrical conductors 13 and 14, respectively. The lead wire 26 is connected to the center-tap of a resistor 28 which resistor is connected across one conjugate diagonal arm of the modulator bridge 19. The lead wire 27 is connected through the series limiting resistor 29 to the adjustable arm 31 of the potentiometer 32. The ends of the potentiometer are connected to the other conjugate diagonal arm of the modulator bridge 19. It is seen, then, that the polarizing, or reference, voltage is applied to the conjugate diagonal arms of the modulator bridge 19 by means of the center-tapped resistor 28 and the potentiometer resistor 32.

The transformer 16, which is provided with the primary winding 17 in series with the load 10, supplies the modulator bridge 19 with a signal voltage. The secondary winding 18 of the transformer 16 is connected across the other conjugate diagonal arm of the modulator bridge 19, in parallel circuit connection with the potentiometer resistor 32. The amount of signal voltage which appears at the transformer secondary winding 18 is directly related to the amount of current which is flowing through the load 10.

The one conjugate diagonal arm of the modulator bridge 19 is connected to a D.-C. voltmeter 33 through a potentiometer 34. The adjustable arm 35 of the potentiometer 34 is connected to one junction of the modulator bridge while one of the fixed potentiometer terminals is connected to the opposite bridge junction by the lead wire 37. The meter 33 provides a visual indication of in-phase load current and depending upon circuit adjustments may indicate the total in-phase load current in the load 10 or only a part thereof. Still further circuit adjustments may be made whereby the meter deflection is zero for one value of loading and only values in excess of this one value of loading will be indicated.

The operation of my above described load meter circuitry will now be described. The mathematical analysis of the bridge network and associated circuitry is quite complex and is not presented here as the general operation of the apparatus can be explained from the known characteristics of the rectifiers 21, 22, 23 and 24 of the modulator bridge 19. Referring to Figure 2 of the drawings, the current flow for one-half cycle of operation is shown. Operation of the circuit will first be described with the movable arm 31 at the center position of the potentiometer resistor 32 and the movable arm 35 at the end of the potentiometer resistor 34, as shown. The "+" and "—" signs adjacent the secondary winding 18 of the transformer 16 and the lead wires 26 and 27 indicate the polarity of the potentials established at a given instant. The solid lines and arrows indicate the path and direction of the current flow from the lead wires 26 and 27 and will be hereinafter referred to as the "reference current." The broken lines and arrows indicate the path and direction of the current flow from the transformer winding 18 of the transformer 16 and will hereinafter be referred to as the "signal current." The reference current switches alternate pairs of rectifier elements in diagonally opposite arms of the modulator bridge from conducting to non-conducting. In Figure 2 of the drawings, the two rectifier elements 22 and 24 are conductive at the indicated polarity of the reference current from the lead wires 26 and 27, while the rectifier elements 21 and 23 are non-conducting. It is seen that with the potentiometer movable arm 31 in the center of the potentiometer resistor 32, and with the lead wire 21 connected to the center point of the resistor 28, that there will be no reference current flowing in the potentiometer resistor 34 and therefor, no indication on the meter 33 due to the action of the reference current. The series resistor 29 in the lead wire 27 limits the reference current which is supplied to the modulator bridge.

The low resistance path for the flow of signal current from the transformer secondary winding 18 includes the rectifier elements 22 and 24. A part of the signal current returns directly through the potentiometer resistor 32, however, most of the signal current finds a path through the conducting rectifier elements 22 and 24. This part of the current path may be traced from the positive side of the transformer secondary winding 18 and through the rectifier element 22, from which it may divide into three parallel paths; one path through the center-tapped resistor 28, one through the potentiometer 34, and another through the indicating instrument 33. The three currents then re-combine and pass through the rectifier element 24 to the negative side of the transformer secondary winding 18. It will be noted that the reference current through the indicating instrument 18 is in a downward direction in Figure 2.

The rectifier elements 21 and 23 are conductive one-half cycle later when the polarity of the reference voltage is reversed. It is apparent that the signal current and reference current are of the same frequency as they are obtained from the same A.-C. potential source 11, therefore, the signal voltage reverses polarity simultaneously with the reference voltage. This condition is shown in Figure 3 of the drawings. The rectifier elements 21 and 23 are now conductive while the rectifier elements 22 and 24 are non-conductive. Again, none of the reference current flows in the potentiometer 34 or meter 33 as long as the movable arm 31 and the lead wire 26 are connected to the center points of the potentiometer 32 and the resistor 28, respectively. The low resistance path for the signal current now includes the rectifier elements 21 and 23 and inspection of the circuit reveals that the current flow through the D.-C. instrument 33 has not changed direction; the current therethrough remains in the downward direction. Thus, a pulsating D.-C. current flows through the D.-C. instrument 18 so long as the polarity of the reference and signal currents change simultaneously. It will be noted that the instrument circuit does not carry any of the polarizing current so long as the movable arm 31 remains at the center position of the potentiometer resistor 32.

Analysis of the measuring circuit discloses that the direct current flow in the measuring circuit of the instrument 18 would be proportional to the product of the signal current and reference current components in the modulator bridge if the rectifier elements operated on a pure square-law. However, the rectifier characteristics are such that the response approaches a linear relation and the instrument deflection is, therefore, not strictly proportional to the product but to some smaller value. The characteristics of the rectifier elements 21 through 24 should be the same among the rectifier elements. The exact magnitude of the instrument deflection or the relationship between the instrument and alternating current components is not particularly important as the essential requirement is that the instrument provides a substantial deflection to indicate the load current. Once the constants of the electrical network are determined, the scale of the instrument 33 may be calibrated in terms of "current," or "load," or "percent load" or other suitable markings.

Copper-oxide rectifiers, which may be used in the bridge network 19, are asymmetrical conductors and the resistance-current relationship approaches the form of a quadratic curve. A relatively small current flow in the normal or forward direction causes a sharp decrease in the rectifier resistance but further increase of the current flow produces progressively smaller, incremental decreases in the resistance. It may be said therefore, that the rectifier is subject to current saturation in that further increase in the current flow produces only a minor change in the resistance. This characteristic is employed to good advantage in the present circuit. By assigning a proper value to the resistor 29, which value will depend upon the potential of the source 11, the magnitude of the reference current flowing through the modulator bridge is kept above the saturation point, and is preferably several times greater than the value of the signal current. This reference current reduces the resistance of the rectifier elements to substantially the lowest value. Hence, voltage fluctuations of the alternating current source do not introduce serious errors in the indications of the instrument and the circuit is inherently stable.

If the polarity of either the signal or reference potentials is reversed the direction of current flow through the meter 33 will also be reversed. The D.-C. voltmeter 33 is preferably of the type wherein the zero position is at one end of the scale and, therefore, the signal and reference connections should be such that the meter deflection is in the proper direction.

A further property of the modulator bridge which is important in the function of the bridge for load meter purposes is that only the in-phase component of the line current, with respect to the polarizing potential, will be indicated on the meter 33. The out-of-phase component of line current is strictly discriminated against and does not appear at the meter 33. While an ordinary ammeter in the line 14 would indicate total current, including the lagging (or leading) component of current, the D.-C. instrument 33 reads only the in-phase component, which is a direct measure of the true load, in terms of watts, on the line.

When my novel load meter is used on a machine tool motor, the initial, in-phase current which is drawn while the motor is idling, may be so large as to obscure additional movements of current as the motor load is increased. The initial, in-phase, current reading may be cancelled out in the meter circuit of my device so that under motor idling conditions the meter reads zero. The potentiometer 32 is used for this purpose. By moving the adjustable arm 31 away from the center position of the potentiometer resistance, it is possible to cause the meter 33 to deflect by action of the reference potential. This added potential which results from warping the potentiometer 32 may be termed a bias potential.

The arm 31 may be adjusted to a position where a bias potential appears at the meter circuit which is equal and opposite to the signal potential thereat under motor no-load conditions. In this manner, subsequent readings on the meter 33 effectively start at zero with the driving motor idling. Any change in the in-phase motor current, upon loading of the machine tool, for example, is easily detected by observing the deflection from zero of the meter 33.

Reference is now made to Figure 4 of the drawings which is similar to Figure 3 except that the potentiometer 32 has been warped by movement of the potentiometer arm to the right in Figure 4 in order to compensate for the signal voltage at the meter 33 which results from the no-load current in the line. It is seen that part of the reference current flows in the meter circuit thereby creating a bias potential which opposes the signal potential thereat. The arm 31 is moved far enough in the proper direction (which is to the right in this illustration) so that the reference current through the meter 33 is exactly equal and opposite to the signal current in the meter. A little thought will reveal that the direction of the reference current in the meter circuit remains the same on the other one-half cycle so that the current therein always opposes the signal current in the meter. In this way small increments of in-phase load current, which result from increases in the machine tool load, are easily detected.

It is desirable to be able to adjust the meter full scale reading to match the full load on the machine tool. In the case of an ordinary ammeter in series with the load, this would ordinarily necessitate cumbersome and time consuming circuit changes. With my novel load meter, full scale deflection of the meter 33, to correspond to full loading of the machine tool, is easily accomplished by use of the potentiometer 34. For example, we could arrange the network component values so that at full loading on the transformer 16, there would be approximately five times as much output as is needed for full scale deflection on the meter directly. The potentiometer may then be adjusted to reduce the current in the meter to that which gives full scale deflection. Meter adjustments are easily made by merely adjusting the potentiometer 34.

It will be seen, then, that my novel load meter possesses advantages over the ordinary ammeter in series connection with the load which advantages include the fact that only the in-phase component of load current is indicated, that small increments of load current may easily be detected by cancelling, or biasing, out the no-load current, and that the meter full scale deflection may be adjusted to match the machine tool full load condition.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:
1. A load meter for measuring the in-phase current flowing in a load supply line and comprising a modulator bridge having rectifier elements sensed in the same direction going around the bridge; a pair of center-tapped resistors connected across each set of opposed bridge junctions; leads connecting the center taps of said resistors across the load supply line thereby applying a reference voltage to the modulator bridge; means to adjust the magnitude of the said reference voltage to saturate the modulator bridge; a current transformer having a primary winding in series connection with the load supply line and a secondary winding connected across one set of opposed junctions of the bridge; and an indicating circuit including a D.-C. indicating instrument conected to the other set of opposed junctions of the bridge.

2. The invention as recited in claim 1 including a potentiometer in said measuring circuit and arranged to vary the voltage applied to the measuring circuit.

3. The invention as recited in claim 2 wherein the center tap in one of said center-tapped resistors is adjustable.

4. Apparatus for indicating the load on a motor energized by an A.-C. power line comprising a modulator bridge having rectifier elements sensed in the same direction going around the bridge; a first center-tapped resistor connected across one set of opposed bridge junctions; a second center-tapped adjustable resistor connected across the other set of opposed bridge junctions; circuit elements including a current-limiting resistor connecting the center taps of the two center-tapped resistors across the power line; a current transformer having a primary winding connected in the power line in series with the motor and a secondary winding connected across the said other set of opposed bridge junctions; and a potentiometer and a D.-C. indicating instrument connected in parallel and across the said one set of opposed bridge junctions, said instrument being calibrated in terms indicative of the motor load.

References Cited in the file of this patent
UNITED STATES PATENTS

| | | |
|---|---|---|
| 2,025,158 | Cowan | Dec. 24, 1935 |
| 2,492,556 | Gruchy | Dec. 27, 1949 |

FOREIGN PATENTS

| | | |
|---|---|---|
| 892,363 | France | Apr. 15, 1944 |